(12) United States Patent
Balakrishnan et al.

(10) Patent No.: US 9,471,068 B2
(45) Date of Patent: *Oct. 18, 2016

(54) LOW COST STORAGE FOR RARELY READ DATA

(71) Applicant: Microsoft Corporation, Redmond, WA (US)

(72) Inventors: Shobana M. Balakrishnan, Redmond, WA (US); David T. Harper, Seattle, WA (US); Stephen Heil, Sammamish, WA (US); Eric C. Peterson, Woodinville, WA (US); Adam B. Glass, Cambridge (GB); David Alex Butler, Cambridge (GB); Austin Nicholas Donnelly, Cambridge (GB); Antony Ian Taylor Rowstron, Cambridge (GB); Sergey Legtchenko, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/516,154

(22) Filed: Oct. 16, 2014

(65) Prior Publication Data
US 2015/0032286 A1    Jan. 29, 2015

Related U.S. Application Data

(63) Continuation of application No. 13/899,497, filed on May 21, 2013, now Pat. No. 8,868,954.

(51) Int. Cl.
*G06F 1/00* (2006.01)
*G05D 23/19* (2006.01)
(Continued)

(52) U.S. Cl.
CPC ............. *G05D 23/1917* (2013.01); *G06F 1/26* (2013.01); *G06F 3/067* (2013.01); *G06F 3/0611* (2013.01);
(Continued)

(58) Field of Classification Search
CPC ............. G06F 1/00; G06F 1/32; G06F 13/00
USPC ...................... 713/323–324; 710/74; 711/114
See application file for complete search history.

(56) References Cited

U.S. PATENT DOCUMENTS

| | | |
|---|---|---|
| 6,295,264 B1 | 9/2001 | Kawakami |
| 7,330,931 B2 | 2/2008 | Le et al. |

(Continued)

OTHER PUBLICATIONS

"Shrinking for Growth: A Unique Persistent Data Storage Solution that Reduces Energy Costs and Provisioning of Power", Published Nov. 1, 2013, 3 Pages. Available at: http://www.busmanagement.com/article/Shrinking-for-Growth-A-Unique-Persistent-Data-Storage-Solution-that-Reduces-Energy-Costs-and-Provisioning-of-Power/.

(Continued)

*Primary Examiner* — Christopher Shin
(74) *Attorney, Agent, or Firm* — Tom Wong; Micky Minhas; Zete Law, P.L.L.C.

(57) ABSTRACT

Low cost storage for write once read rarely data is described. In an embodiment a storage device comprises a plurality of hard disk drives connected to a server via an interconnect fabric. The storage device comprises a cooling system which is only capable of cooling a first subset of the hard disk drives and a power supply system which is only capable of powering a second subset of the hard disk drives and in some examples, the interconnect fabric may be only capable of providing full bandwidth for a third subset of the hard disk drives. Each subset may comprise only a small fraction of hard disk drives. A control mechanism, which may be implemented in software, is provided which controls which hard disk drives are active at any time in order that the constraints set by the cooling and power supply systems and interconnect fabric are not violated.

20 Claims, 15 Drawing Sheets

(51) Int. Cl.
  *G06F 3/06* (2006.01)
  *G06F 1/26* (2006.01)
  *G06F 13/40* (2006.01)
  *G06F 13/00* (2006.01)

(52) U.S. Cl.
  CPC ........... *G06F 3/0613* (2013.01); *G06F 3/0625* (2013.01); *G06F 3/0634* (2013.01); *G06F 3/0689* (2013.01); *G06F 13/4068* (2013.01); *Y02B 60/1246* (2013.01)

(56) References Cited

U.S. PATENT DOCUMENTS

| | | |
|---|---|---|
| 7,870,409 B2 | 1/2011 | Murase |
| 8,135,905 B2 | 3/2012 | Mori |
| 8,140,754 B2 | 3/2012 | Kaneda |
| 8,286,019 B2 | 10/2012 | Murase |
| 8,301,852 B2 | 10/2012 | Hutchison et al. |
| 8,312,214 B1 | 11/2012 | English |
| 8,707,070 B2 | 4/2014 | Muller |
| 2006/0279869 A1 | 12/2006 | Yamamoto et al. |
| 2008/0270699 A1 | 10/2008 | Anzai et al. |
| 2009/0063883 A1 | 3/2009 | Mori |
| 2009/0086563 A1 | 4/2009 | Morein |
| 2009/0313427 A1 | 12/2009 | Ukai et al. |
| 2009/0319811 A1 | 12/2009 | Kawakami |
| 2011/0072291 A1 | 3/2011 | Murase |
| 2011/0239013 A1 | 9/2011 | Muller |
| 2012/0278549 A1 | 11/2012 | Dutton et al. |
| 2014/0108837 A1 | 4/2014 | Muller |

OTHER PUBLICATIONS

Storer, et al., "Pergamum: Replacing Tape with Energy Efficient, Reliable, Disk-Based Archival Storage", In Proceedings of in 6th Conference on File and Storage Technologies, Feb. 26, 2008, 16 pages.

Zhu, et al., "Hibernator: Helping Disk Arrays Sleep through the Winter", In Proceedings of the Twentieth ACM Symposium on Operating Systems Principles, Oct. 23, 2005, 14 pages.

Taube, Gareth, "Goodbye Spinning DisksMake Way for the Total SSD Data Center", Published Feb. 2, 2012, 4 Pages. Available at: http://www.theiostorm.com/goodbye-spinning-disks/.

"International Search Report & Written Opinion for PCT Patent Application No. PCT/US2014/038866", Mailed Date: Aug. 11, 2014, Filed Date: May 21, 2014, 11 Pages.

International Preliminary Report on Patentability Issued in PCT Application No. PCT/US2014/038866, Mailed Date: Aug. 5, 2015, 9 Pages.

Notice of Allowance Issued in U.S. Appl. No. 13/899,497, Mailed Date: Jun. 25, 2014, 9 Pages.

LOW COST STORAGE FOR RARELY READ DATA

RELATED APPLICATIONS

This application is a continuation of and claims priority to application Ser. No. 13/899,497, filed on May 21, 2013, and entitled "LOW COST STORAGE FOR RARELY READ DATA." This application claims the benefit of the above-identified application, and the disclosure of the above-identified application is hereby incorporated by reference in its entirety as if set forth herein in full.

BACKGROUND

There are large amounts of data which are written once to a data storage device and then subsequently only read rarely and examples include archival storage of email and secondary geo-distributed replicas of data. On the rare occasions that this data is read, timely access is required and so use of magnetic tape based solutions (where robotic arms fetch tapes from a library and insert them into tape drive where they are mechanically wound to the correct point), which are typically used for cold storage, is not appropriate because of the high access latency. Tapes can also be affected by environmental conditions (e.g. humidity) and so durability may be limited. Existing storage solutions which provide low latency access are based on physical hard disks and solid state drives; however these have a high power consumption and are also expensive to buy.

The embodiments described below are not limited to implementations which solve any or all of the disadvantages of known storage solutions.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Low cost storage for write once read rarely data is described. In an embodiment a storage device comprises a plurality of hard disk drives connected to a server via an interconnect fabric. The storage device comprises a cooling system which is only capable of cooling a first subset of the hard disk drives and a power supply system which is only capable of powering a second subset of the hard disk drives and in some examples, the interconnect fabric may be only capable of providing full bandwidth for a third subset of the hard disk drives. Each subset may comprise only a small fraction of hard disk drives. A control mechanism, which may be implemented in software, is provided which controls which hard disk drives are active at any time in order that the constraints set by the cooling and power supply systems and interconnect fabric are not violated.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
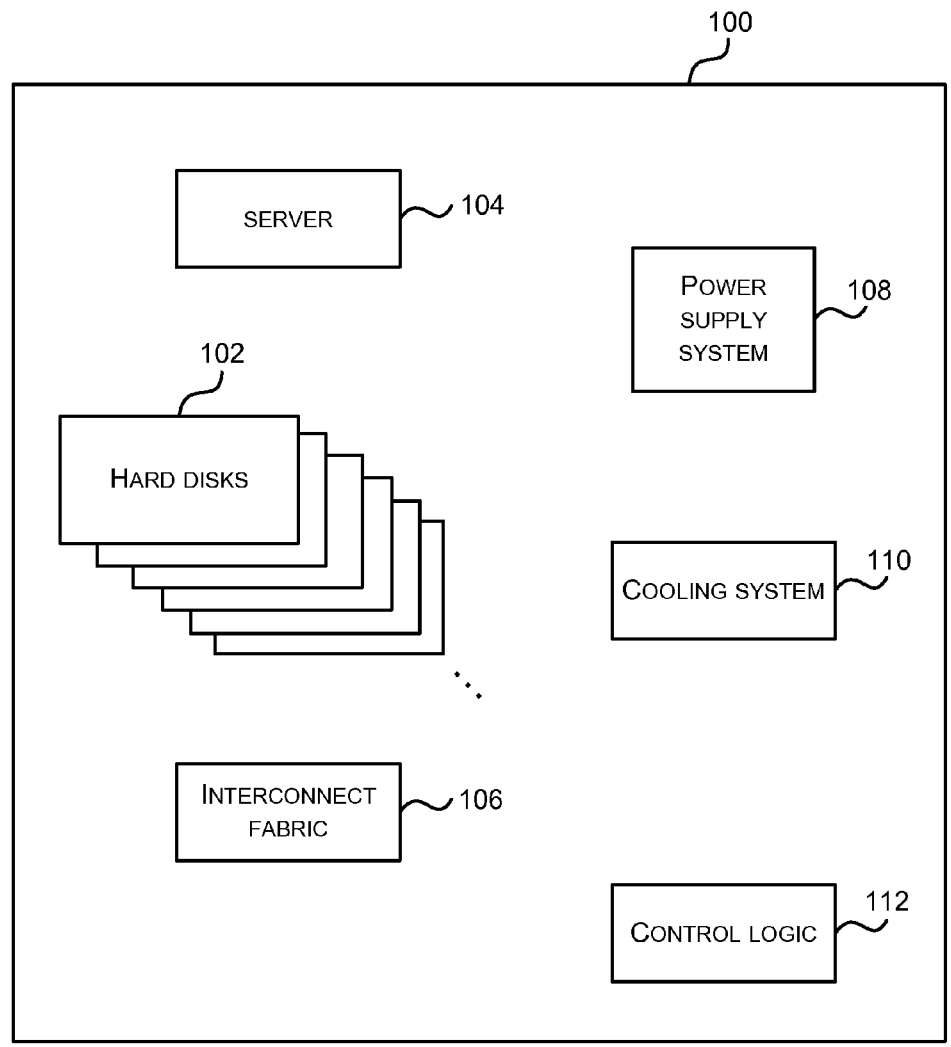
FIG. 1 is a schematic diagram of an example storage device.

FIG. 1 is a schematic diagram of an example storage device 100. The storage device 100 may be a rack-scale device (with a standard rack form factor) or may have an alternative form factor. The storage device comprises a large number of hard disk drives (HDDs) 102 (e.g. over 1000 HDDs) and a server 104. Each HDD 102 comprises a platter (or disc) which is spun at high speeds when active (i.e. when data is being read or written). To reduce power consumption, the platters can be spun down (i.e. stopped); however, there is a latency associated with spinning up a platter and data cannot be read or written whilst a platter is spun down. For the purposes of the following description, this latency is assumed to be around 10 seconds, although it will be appreciated that the latency may be shorter or longer than this.

An interconnect fabric 106 is provided within the device which interconnects the HDDs 102 and the server 104. Power is provided by a power supply system 108, which although it is shown as a single block in FIG. 1 may be distributed throughout the storage device 100. Cooling (for the HDDs 102) is provided by a cooling system 110, which may for example be a forced air cooling system using one or more fans to force (push or pull) air around the HDDs.

In the storage device 100, both the power supply system 108 and cooling system 110 are significantly underprovisioned such that the storage device 100 cannot support all the HDDs 102 being active (i.e. with their platters spinning) at one time and instead, the power supply system 108 and cooling system 110 can only support a small fraction (e.g. 10% or less and in one example 8.3%) of the HDDs 102 being active simultaneously. If all the HDDs 102 in the storage device 100 were to start to spin their platters simultaneously, it would result in failure of the storage device 100 and consequently a mechanism is provided within the storage device 100 to control the number of HDDs 102 which are active at any one time. This mechanism may be provided by software running on the server 104 (e.g. by a scheduler) and/or control logic 112 within the storage device 100.

The underprovisioning of the power supply system 108 and the cooling system 110 within the storage device 100 (i.e. characteristics of the power supply system and cooling system) set constraints on the number of HDDs 102 that can be active at any time and these constraints may be referred to as 'hard constraints' because if they are violated the storage device 100 will (or is very likely to) fail. Dependent on the design of the storage device 100, there may be one or more other hard constraints and/or one or more soft constraints. Examples of soft constraints may include a bandwidth constraint (e.g. a maximum bandwidth of an interface to the server 104 from an external network or bandwidth constraint within the interconnect fabric 106) and a vibration constraint. Violation of a soft constraint does not cause failure (or very likely failure) of the storage device 100 but instead will degrade performance (e.g. exceeding a bandwidth constraint would slow access to the device) and/or may cause longer term damage (e.g. exceeding a vibration constraint is unlikely to cause failure of the storage device in the short term but might, over a longer period of time, cause damage that may ultimately lead to failure of the storage device 100). These constraints (e.g. the power and cooling constraints and any additional constraints which may be used, such as a bandwidth constraint resulting from the interconnect fabric) are managed by the software running on the server 104 and/or the control logic 112.

Although FIG. 1 shows the server 104 being located within the storage device 100, in some examples, the server 104 may be located outside the storage device 100 and in some examples the server 104 may be located remotely from the storage device 100. Furthermore, although FIG. 1 shows a single server 104, it will be appreciated that the storage device 100 may comprise more than one server (e.g. for redundancy purposes) and where there are multiple servers all the HDDs 102 may be connected to a single server 104 (with the HDDs being switched to the second server in the event of server failure) or the HDDs 102 may be split with a subset being connected to one server and another (disjoint) subset being connected to another server (where these subsets may be fixed or may be dynamically changed over time). In some examples, there may be more than one interconnect fabric 106 and more than one independent server 104, with the different interconnect fabrics 106 connecting the HDDs 102 to multiple servers or to different servers. This provides resilience against server and/or interconnect fabric failure.

The HDDs 102 are described herein as being active (i.e. having their platters spinning) or not being active (i.e. with their platters not spinning) which is also referred to herein as the HDD being in standby as the electronics within the HDD are still powered. It will be appreciated that the HDDs 102 may have more than two states (active/not active), such as being in transition from not active to active (i.e. where the platters are spinning up), being in transition from active to not active (i.e. where the platters are spinning down), being fully off (i.e. no power to the electronics) and various other low power states. For the purposes of the following description the active state is considered to include both a state where the platters are spinning and data is being read/written and a state where the platters are spinning and data is not being read/written (which may be referred to as an 'idle' state) because both of these states consume a similar amount of power (e.g. 8 W). The spinning up state consumes a larger amount of power over a short period of time (e.g. 24 W for 10 seconds) and may be considered as part of the active state (e.g. for the purposes of power accounting) or separately. In an example implementation, the state of each HDD may be tracked as one of three states: standby (or not active), spinning up and active. It will be appreciated that in other examples, additional HDD states may also be considered (e.g. a fourth state of spinning down may also be tracked where this takes a non-trivial amount of time to complete).

Figure 2:
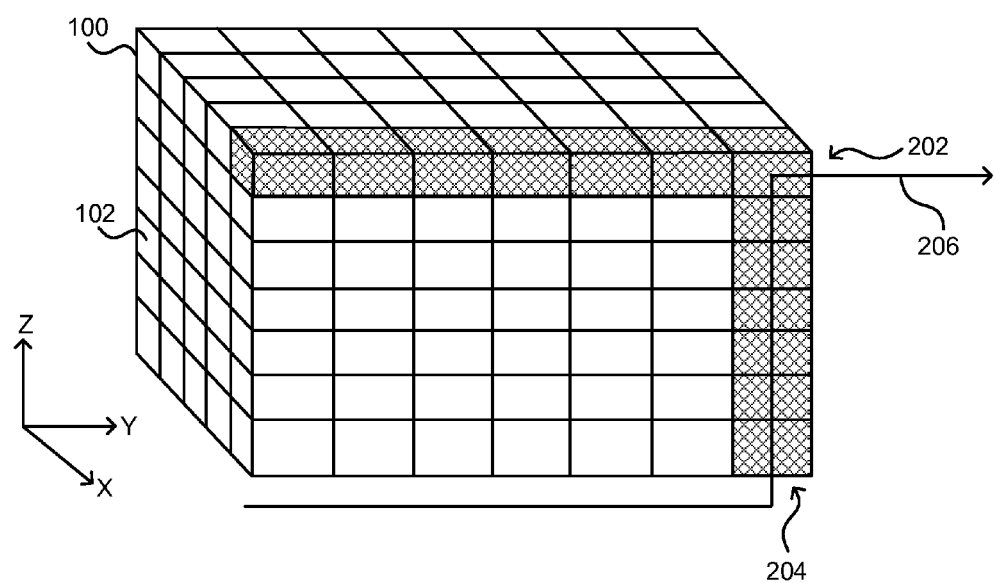
FIG. 2 shows another schematic diagram of an example storage device.

FIG. 2 shows another schematic diagram of an example storage device 100. This diagram shows an example 3D arrangement of the HDDs 102 in which each HDD 102 may be identified by its (x,y,z) coordinate. It will be appreciated that the HDDs 102 may not be located in a regular grid within an actual storage device 100; however, this representation, as shown in FIG. 2, provides a logical representation of the HDDs 102 for the purposes of the following description.

The HDDs 102 within the storage device 100 may be arranged, as a result of the device design, into disjoint (or non-overlapping) subsets which are linked by a power constraint and in an example, the HDDs 102 may be arranged in trays 202 where HDDs 102 in a tray 202 have the same value of x and z (and varying values of y) and one tray is shown as shaded cells in FIG. 2. The power constraint is set by the maximum amount of power that can be delivered to a tray. In an example, the power constraint may specify that only two HDDs may be active within a single tray and in some examples this constraint may be further qualified in that only one of the two active HDDs may be in the spinning up state. Although FIG. 2 shows a storage device 100 with 35 trays, it will be appreciated that this is by way of example only and a storage device 100 may comprise any number of trays. In an example, a storage device may comprise 72 trays and each tray may comprise 16 HDDs.

The HDDs 102 within the storage device 100 may be further arranged into disjoint subsets which are linked by a cooling constraint (e.g. where they are in the same air path within the cooling system 110). In an example, the HDDs 102 may be arranged in columns 204, where HDDs in a column have the same value of x and y (and varying values of z) and one column is shown as shaded cells in FIG. 2. In an example, the cooling system 110 may force air in at the front, up through a column and out at the back of the storage device 100 (as indicated by arrow 206) and so it can be seen that all the HDDs in column 204 are linked by a cooling constraint as they are all located on the same cooling path (i.e. in the same vertical airflow) through the device. In an example, the cooling constraint may specify that only one HDD may be active within a single column. Although FIG. 2 shows a storage device 100 with 35 columns, it will be appreciated that this is by way of example only and a storage device 100 may comprise any number of columns. In an example, a storage device may comprise 96 columns (with each column comprising 12 HDDs).

As can be seen from FIG. 2, columns and trays are not disjoint and there is an overlap of one HDD between tray 202 and column 204. The two constraints are therefore not independent. Furthermore, the two constraints may set different upper limits on the total number of HDDs which may be active in the storage device 100 at any one time and in which case, the lower of the two upper limits is used. For example, in a system comprising 1152 HDDs arranged in trays of 16 HDDs and columns of 12 HDDs, the power constraint sets a maximum number of HDDs active at any time of 144 (2 per tray, with 72 trays) whilst the cooling constraint sets a maximum number of HDDs active at any time of 96 (1 per column, with 96 columns) and so the overall limit on the number of active HDDs at any time in the storage device is 96.

Figure 3:
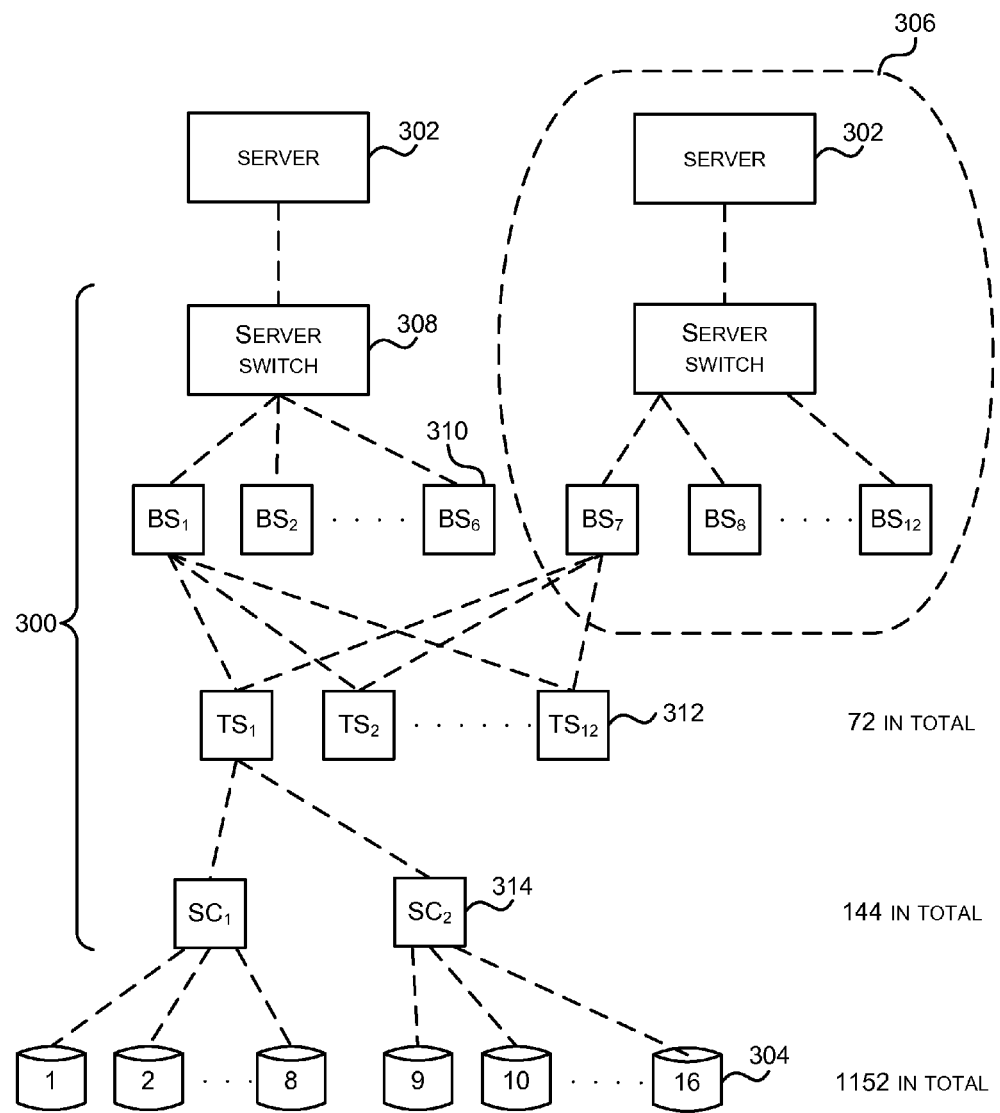
FIG. 3 shows a schematic diagram of a first example interconnect fabric.

FIG. 3 shows a schematic diagram of a first example interconnect fabric 300. This example shows an interconnect fabric for a storage device comprising two servers 302 where the second server is connected to (or connectable to) all the HDDs 304, e.g. for redundancy in the case of server failure. It will be appreciated, however, that for a single server solution, the elements ringed by the dotted outline 306 may be omitted. This example interconnect fabric 300 uses PCI express (PCIe) and comprises a plurality of components 308-314 which are physically distributed within the storage device 100 to reduce the number of cables (to reduce the possibility of misconnections by humans) by replacing them with PCB traces, to reduce the length of those PCB traces (as the PCI signal is degraded as it travels along the traces), to reduce the length of any cables which are used (which reduces cost) and to extend (or optimize) the workable distance between a server 302 and a HDD 304. The workable distance is extended through distribution of components within the storage device because each PCIe component reconditions the signal.

As shown in FIG. 3, a server 302 is connected to a server switch 308 and there is one server switch for each server. Each server switch 308 is connected to a plurality of backplane switches 310 (denoted $BS_n$). In the example shown in FIG. 3 there are 6 backplane switches 310 connected to a server switch 308 and in an example implementation, this connection (server switch 308 to each backplane switch 310) may be the only connection which uses cables rather than PCB traces. A backplane switch 310 connects to a plurality of tray switches 312 (denoted $TS_n$) and in the example shown there are 12 tray switches connected to a backplane switch 310. It can be seen that where there are two servers 304, there is no duplication at the tray switch level of the interconnect fabric, and each tray switch 312 connects to two backplane switches 310: one which is connected to the first server and one which is connected to the second server. As there are 6 backplane switches 310 (for each server 302), there are a total of 72 tray switches 312 in the example shown in FIG. 3. Within a tray there are two SATA controllers 314 (denoted $SC_n$) and these connect the tray switch 312 to the individual HDDs 304. As shown in FIG. 3, each SATA controller 314 connects to half of the HDDs 304 in the tray. As there are 72 tray switches in the example shown in FIG. 3, there are 144 SATA controllers connecting to a total of 1152 HDDs, with each SATA controller being connected to 8 HDDs.

The interconnect fabric may provide a bandwidth constraint, as can be explained with reference to FIG. 3; however, in some cases the bandwidth constraint need not be considered explicitly when determining which HDDs can be active, for example where if the power and cooling constraints are satisfied the bandwidth constraint is always also satisfied.

In the example shown in FIG. 3, each HDD 304 may have a 1 Gb/s link to a SATA controller 314, giving a total capacity at this level in the interconnect fabric of 1152 Gb/s. At the next level up, each SATA controller 314 may have a 4 Gb/s link to a tray switch 312, giving a total capacity at this level in the interconnect fabric of 576 Gb/s (half that of the previous level). Each tray switch 312 may then have a 8 Gb/s link to a backplane switch 310, giving a total capacity at this level in the interconnect fabric of 576 Gb/s. Each backplane switch 310 has a 16 Gb/s link to a server switch 308, giving a total capacity at this level in the interconnect fabric of 192 Gb/s (one third of the previous level) and each server switch 308 has a 32 Gb/s link to a server 302. Alternatively, each tray switch 312 may have a 4 Gb/s link to a backplane switch 310 (giving a total capacity at this level of only 288 Gb/s or half that of the previous level) and each backplane switch 310 may have a 8 Gb/s link to a server switch 308 (giving a total capacity at this level of only 96 Gb/s, which is one third of the previous level). Both of these examples clearly demonstrate that if all 96 HDDs which are permitted by the cooling and power constraints to be active, are active, there is insufficient bandwidth within the interconnect fabric 300 to read and/or write to them all. Consequently in this example, a bandwidth constraint (as a consequence of an underprovisioned interconnect fabric) may also be considered when determining which HDDs are to be active at any one time. As described above, a bandwidth constraint is considered a soft constraint as it causes congestion and latency and does not result in the failure of the storage device.

Figure 4:
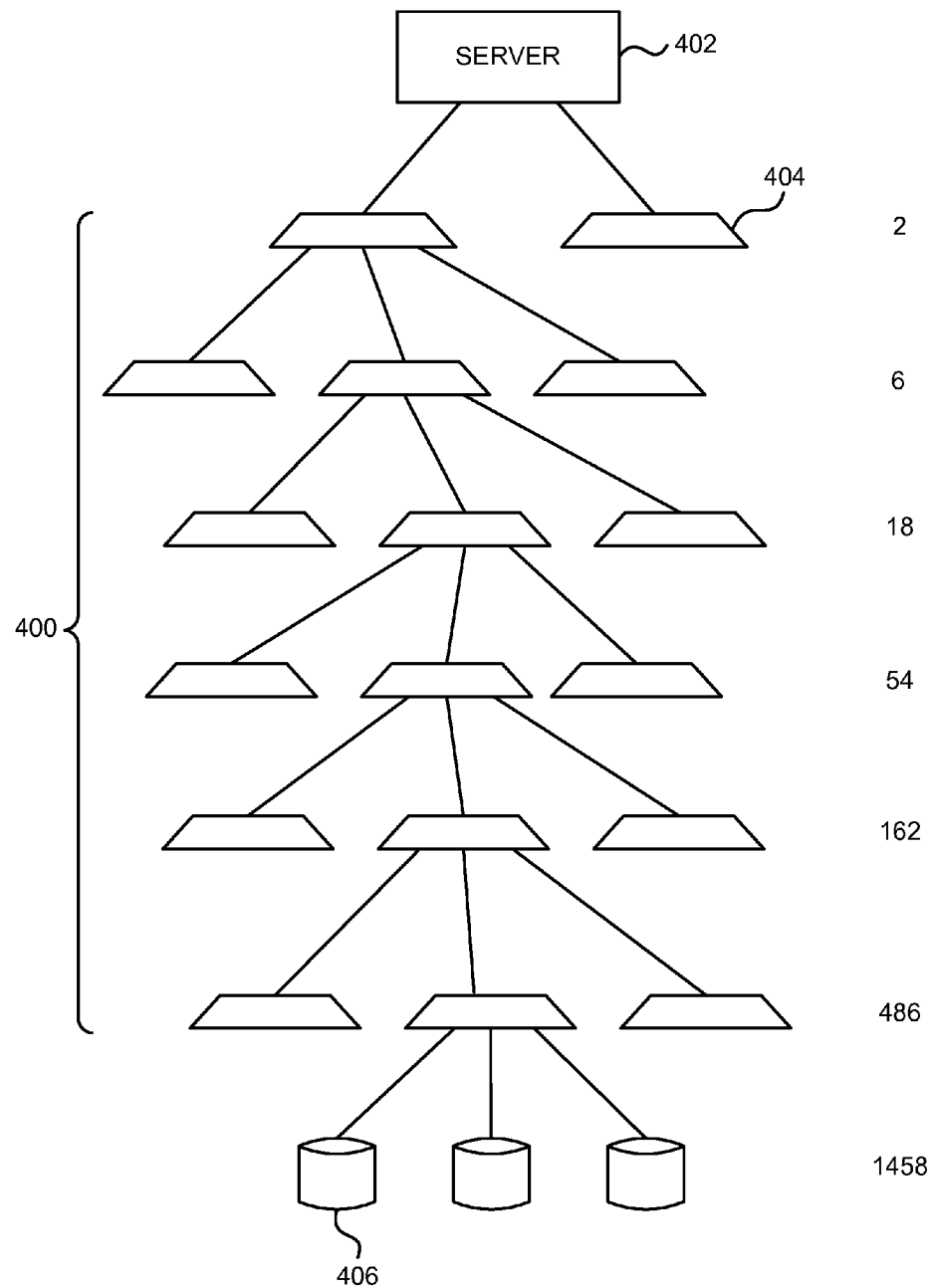
FIG. 4 shows a schematic diagram of a second example interconnect fabric.

FIG. 4 shows a schematic diagram of a second example interconnect fabric 400 and in this example only a single server 402 is shown; however the fabric may be modified for use with two servers (e.g. by connecting each of the top level multiplexers to both servers). This example interconnect fabric 400 comprises a tree of SATA multiplexers 404 which is connected to a small number of SATA ports provided on the server 402 and uses the hotplug infrastructure within SATA. In this example, the tree is 6 layers deep, with two multiplexers 404 at the top level and 486 multiplexers at the bottom level, which each connect to a plurality of HDDs 406. It will be appreciated that for purposes of clarity not all the multiplexers 404 or HDDs 406 are shown in FIG. 4. In this SATA implementation, there is only one active route through the tree at any time. Those HDDs which are not active are effectively hot unplugged when they transition from being active to being not active and they are no longer visible (or in communication with) the server 402. This contrasts with the PCIe approach (interconnect fabric 300) shown in FIG. 3 in which there is direct connectivity to each HDD and this enables pre-emptive powering up of HDDs (i.e. powering up a set of HDDs while reading from or writing to another set of HDDs), which is not possible using the interconnect fabric 400 shown in FIG. 4. Although FIG. 4 shows use of SATA multiplexers 404, in a further example interconnect fabric, SATA multipliers may alternatively be used (however this would increase the cost of the interconnect fabric and as SATA multipliers cannot be daisy-chained, it would limit the number of HDD that could be connected).

As described above, the power and cooling systems within the storage device 100 described herein (and shown in FIGS. 1 and 2) are significantly underprovisioned such that all the HDDs cannot be spun up simultaneously (i.e.

there is both insufficient power and insufficient cooling). In standard computing devices, however, the HDDs are automatically spun up on start-up and processes may intermittently spin up HDDs for other purposes (e.g. when scanning files for viruses, indexing files to allow searching inside them, checking whether a disk is encrypted, checking disk failure prediction counters, checking whether a disk has been formatted in a legacy way, etc). To prevent this in the storage device described herein, an access (or 'no access') flag may be stored within the server for each HDD and then software running on the server (e.g. the operating system) is modified such that when a HDD is marked 'no access' then all operations on that HDD fail. This is shown in the example flow diagram 500 in FIG. 5.

Figure 5:
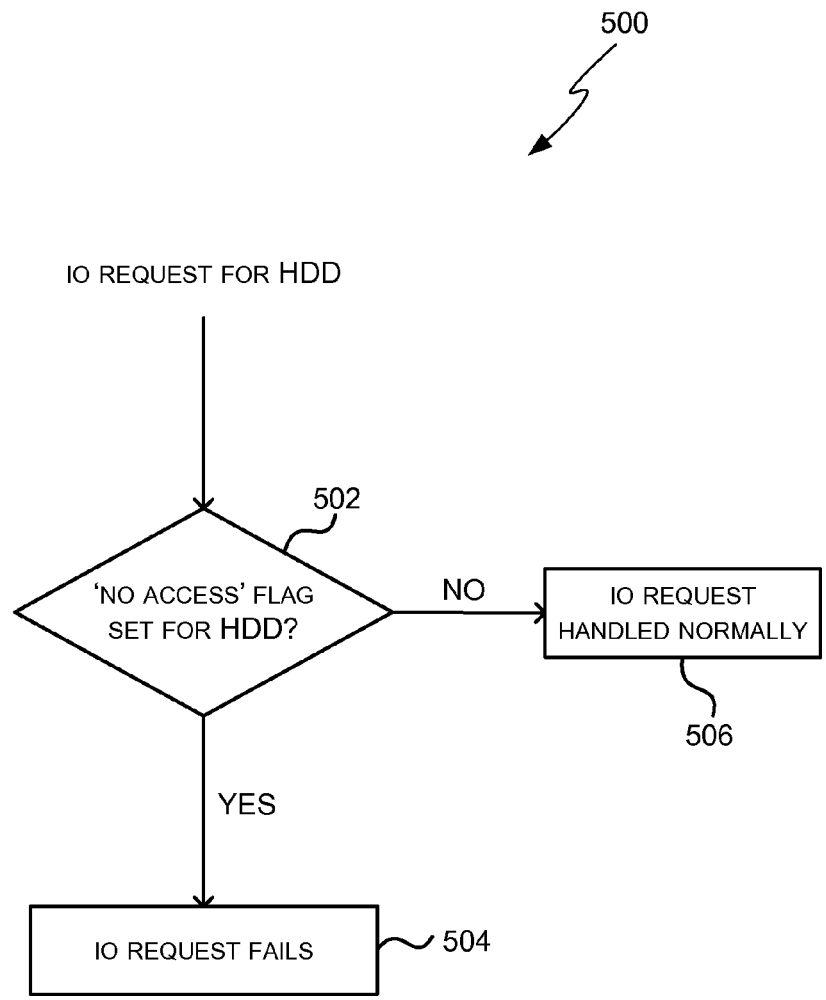
FIG. 5 is a flow diagram of an example method of controlling accesses to a HDD.

FIG. 5 is a flow diagram of an example method of controlling accesses to a HDD. When an IO request for a HDD is issued, a check is performed to see whether the 'no access' flag for the HDD is set (block 502) and if the flag is set ('Yes' in block 502), the IO request fails (block 504). However, if the flag is not set ('No' in block 502), the IO request is handled normally (block 506). At start-up all non-boot HDDs may have their flags set (indicating 'no access') and HDDs may subsequently have their flags unset/set as they switch between non active and active states. Depending on implementation, the flag may be set to either 1 or 0 to indicate 'no access'. In addition, the HDD driver may be modified to change how it discovers HDDs during the boot sequence. Such a modified driver is arranged to spin-up, probe, identify and then spindown each HDD in sequence. Existing drivers may perform staggered spin up of HDDs, but do not spin down one HDD before spinning up the next HDD.

Figure 6:
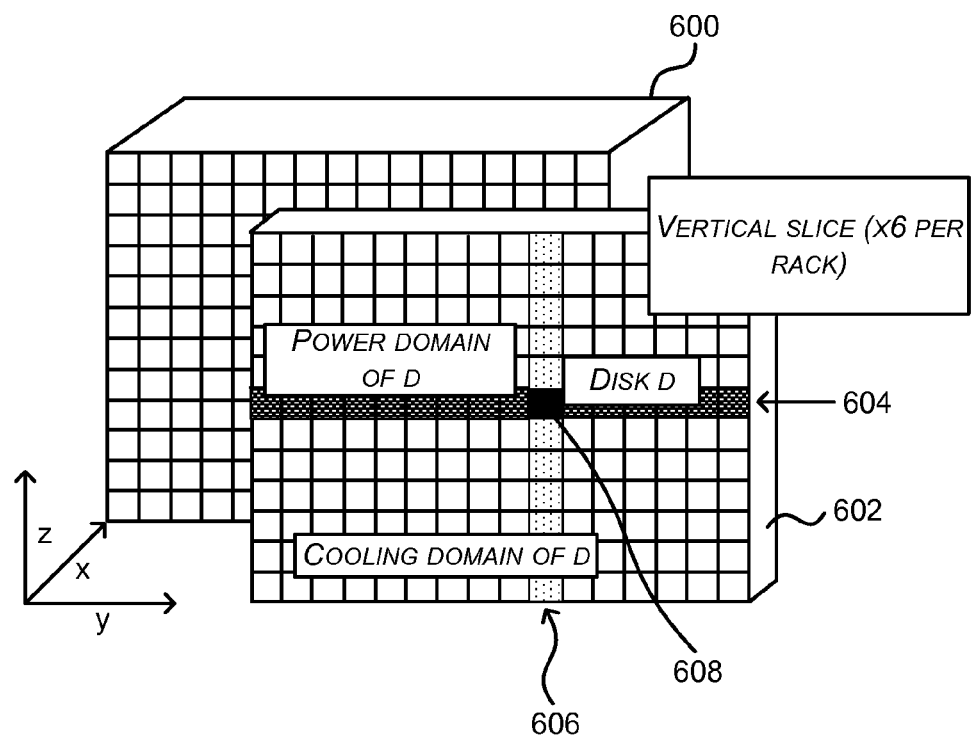
FIG. 6 is a schematic diagram showing domains within a storage device.

As described above, the power and cooling (and potentially other) constraints limit the number of HDDs that can be active within the storage device at any time and software running on the server and/or control logic is used to control which HDDs are active (and set corresponding access flags, where these are used). Referring back to the example storage device shown in FIG. 2, the HDDs within a storage device may be represented as a regular grid of cells, with each cell corresponding to a HDD 102 and each HDD being referenced by an (x,y,z) coordinate. As described above, the cooling constraint operates within a column 204 and this may be referred to as a 'cooling domain', with two HDDs that have the same x and y coordinates sharing a cooling domain. Similarly, the power constraint operates horizontally within a tray and this may be referred to as a 'power domain', with two HDDs that have the same x and z coordinates sharing a power domain. The term 'slice' may be used to refer to the smallest part of the storage device for which power and cooling domains are self-contained and HDDs that have the same x coordinates are in the same slice and HDDs from two different slices cannot share power or cooling domains. FIG. 6 is another schematic diagram showing domains within a storage device 600 and in this example, a slice 602 is shown separate from the rest of the storage device. FIG. 6 also shows the power domain 604 and the cooling domain 606 of a HDD 608 in the slice 602.

In various examples, the HDDs within the storage device may be divided logically into non-overlapping groups with each group comprising a plurality of HDDs which can all be active simultaneously without violating the power and cooling constraints. In such examples, each HDD is a member of a single group and it will be appreciated that a group does not comprise all the HDDs that can be active simultaneously (e.g. multiple groups may be active simultaneously). In an example implementation, the HDDs may be partitioned into logical groups such that each group has the same number of HDDs (e.g. 16 HDDs) and HDDs of one group can be cooled and powered together (i.e. they do not violate the power or cooling constraints). In some examples, there may be also be a bandwidth (soft) constraint that HDDs of one group have no bandwidth conflicts within the interconnect fabric unless they saturate the root of the tree (e.g. the PCIe tree shown in FIG. 3).

Some of the groups will be mutually exclusive because domains (cooling and/or power) of their HDDs overlap and these groups may be described as colliding. Groups that are not colliding may be described as being disjoint and by grouping HDDs to maximize the disjointness of the HDDs (i.e. to maximize the probability that any HDD within one group is not in the same cooling or power domain as a HDD in another group), the probability that two groups selected at random can be active simultaneously is increased and the throughput of the storage device is increased. An example layout which maximizes group disjointness is one where two groups are arranged to be either disjoint or to collide fully (i.e. each HDD of the first group is in the cooling and power domain of HDDs in the second group).

Figure 7:
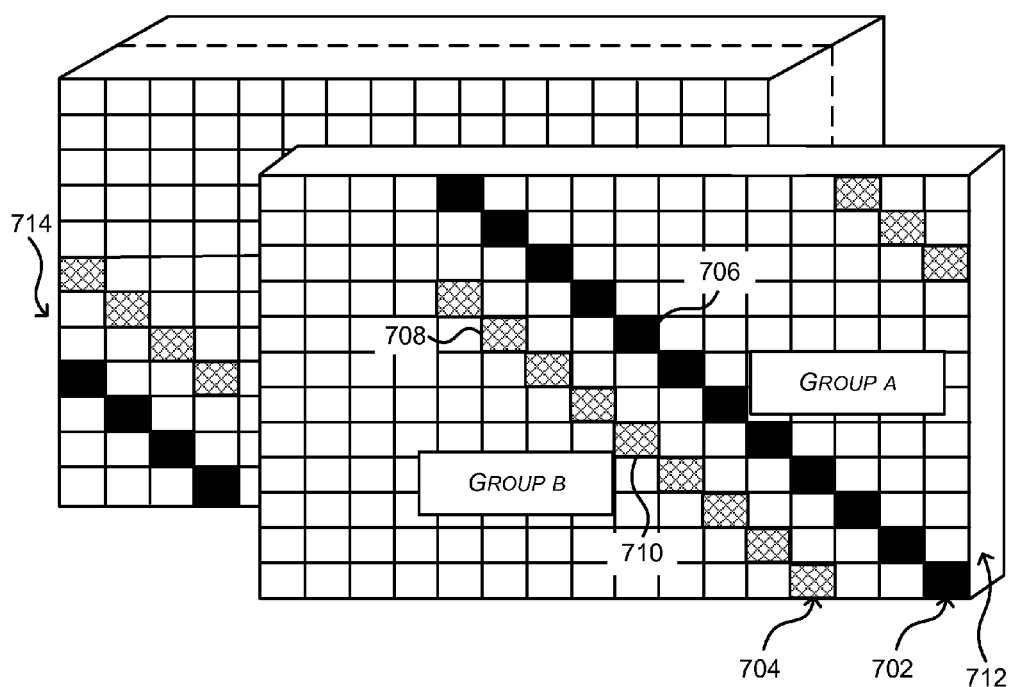
FIG. 7 is a schematic diagram showing an example group construction that achieves maximal disjointness.

FIG. 7 shows an example group construction (for 16 HDD per group) that achieves maximal disjointness. FIG. 7 shows two groups 702, 704 and HDDs within each group are placed along a diagonal to avoid in-group collisions. It can clearly be seen that each HDD in the first group 702 is in both a power domain and a cooling domain of HDDs in the second group 704. Taking an example HDD 706 in the first group 702, it is in the power domain of one HDD 708 in the second group 704 and in the cooling domain of a second HDD 710 in the second group. As each group contains more HDDs than there are power domains (12 power domains compared to 16 HDDs) in a single slice (and where in this example there are fewer power domains than cooling domains, so this is the limiting factor), each group comprises HDDs from two slices 712, 714 and this example the two slices are adjacent to each other within the storage device. Using the example arrangement shown in FIG. 7, it is possible to build 72 well-formed groups of 16 HDDs. Each group is fully colliding with 11 groups in the same slice and can be concurrently spun up with any of the remaining 60 groups.

Figure 8:
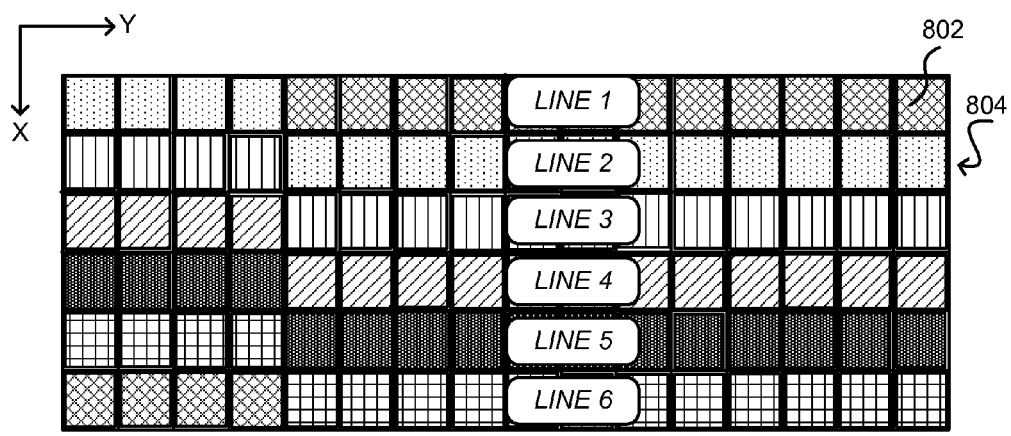
FIG. 8 is a schematic diagram showing a representation of the HDDs within a storage device from above.

If the group placement strategy described above is used, it is a simple operation to identify joint-groups (i.e. groups that collide): two groups share power and cooling domains if (and only if) they are located in the same slices. A line of a group may be defined as the equivalence class that contains all the groups that are joint with the group and this is shown in FIG. 8. FIG. 8 is a schematic diagram showing a representation of the HDDs within a storage device from above. Each cell 802 represents a cooling domain and each row 804 represents a slice. Each line is shown by way of shading and is composed of 12 groups of 16 HDDs that completely overlap power and cooling domains. Each line has the properties that: groups from the same line should be scheduled sequentially and groups from any two lines can spin up and be active (e.g. perform IO) concurrently. Referring to the specific example shown in FIG. 8, each group of any line can spin up concurrently with any group of the other lines and any two of the 6 lines can be active concurrently.

Figure 9:
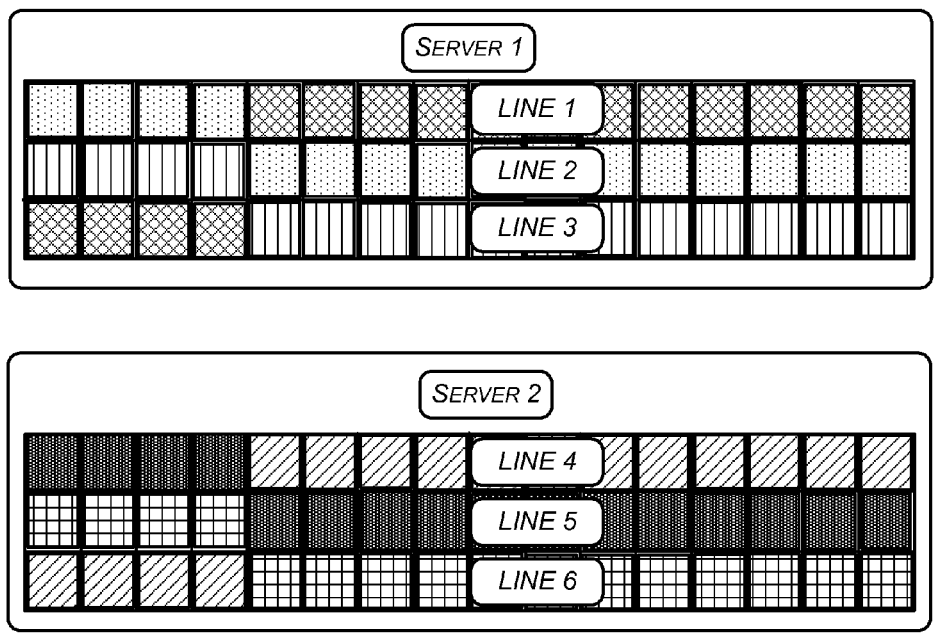
FIG. 9 is a schematic diagram showing a representation of the HDDs within a storage device from above in a two server scenario.

In a storage device which comprises two servers which are active at the same time (rather than switching between the servers on server failure), the groups may be assigned to servers in order to prevent inter-server scheduling conflicts and as shown in FIG. 9 a mapping between slices and servers may be used. Using a mapping from slice to server is beneficial as a slice is self-contained in terms of cooling/power domains and as shown in FIG. 9, lines may be re-arranged so that any slice will belong to exactly one server. Comparing FIGS. 8 and 9 it can be seen that in the multi-server scenario of FIG. 9, line 1 wraps from the first slice to the third slice (instead of the sixth slice) in order that the first three slices can be mapped to the first server. Similarly, line 4 wraps from the fourth slice to the sixth slice (instead of the third slice).

Although the examples described above show groups of 16 HDDs, in other examples different sizes of groups may be used (i.e. different numbers of HDDs). In some examples, the size of a group may be selected such that it divides evenly into (i.e. is a factor of) the maximum number of concurrently active disks (e.g. is a factor of 96 in many of the examples described herein), i.e. such that an integer number of groups can be active concurrently, as this improves efficiency. Spinning up part of a group (e.g. half a group) is less efficient and more complex to control than spinning up only complete groups as any IOs will require the entire group to be active. Smaller group sizes (i.e. groups comprising a smaller number of HDDs) improves scheduling performance because the number of groups is higher and the scheduler has more freedom to choose which group to schedule next (see discussion of scheduling below with reference to FIGS. 12 and 13). However, small groups offer less throughput per group (and therefore per operation) and incur a larger overhead where erasure coding and striping (as described below) is used. For a one server solution (i.e. where only one server is operating at any time) with the architecture described above (72 trays, each comprising 16 HDDs, giving a total of 1152 HDDs), reasonable group sizes may include 16 HDDs (6 active groups at any time), 24 HDDs (4 active groups at any time), 32 HDDs (3 active groups) or 48 HDDs (2 active groups). For a two server scenario (and still with an architecture comprising 72 trays of 16 HDDs), there may be 16 HDDs in a group (3 spinning groups per server) or 24 HDDs (2 groups per server). It will be appreciated that for other architectures, different group sizes may be used.

Figure 10:
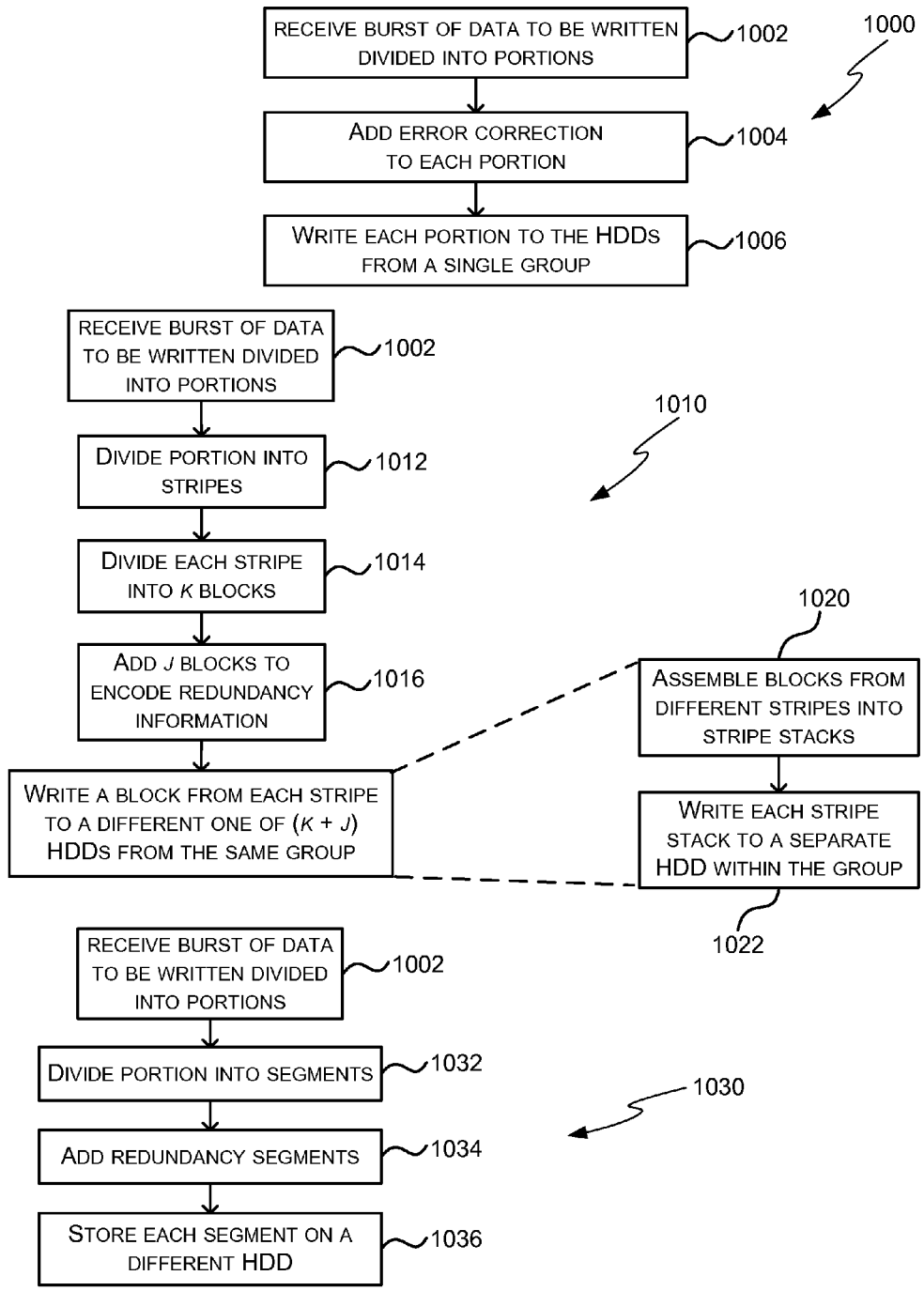
FIG. 10 shows flow diagrams of example methods of writing data to a storage device.

FIG. 10 shows flow diagrams of example methods of writing data to a storage device as described herein. The first example method 1000 uses the concept of groups of HDDs as described above. As shown in method 1000, a burst of data which is to be written to the HDDs is divided (prior to being presented to the server) into portions, which may be referred to as 'extents', and these extents are received by the server (block 1002). Extents may be of a variable size (e.g. within a range defined by a minimum and maximum size) and each extent may, for example, be 1 GB (or larger) in size. Error correction is then added to each extent (block 1004) and any suitable error correction technique may be used. This error correction may be added by the server or an external party. In an example, erasure coding may be used and in other examples, other methods, such as parity checks, may be used. Each extent is then written to the HDDs from a single group (block 1006). This means that when reading the extent, it is guaranteed that the entire extent can be read simultaneously and it will not be necessary to switch between groups (i.e. by transitioning a first group to being non active and spinning up the platters of the HDDs in a second group) in the middle of reading an extent (which would add considerable latency).

FIG. 10 also shows a more detailed example method 1010 of writing data to a storage device described herein. In this method 1010, a single extent is divided into fixed size stripes (block 1012) and each stripe is then split into a fixed number, k, of blocks (block 1014), where k is an integer. Depending on the error correction technique used, j blocks may be added to encode redundancy information for each stripe (block 1016), where j is an integer, such that each stripe now comprises (k+j) blocks. A block from each stripe is then written to a different one of (k+j) HDDs from the same group (block 1018). In this way, all blocks across all stripes are written to the same (k+j) HDDs and as in the first method 1000, each extent (or portion) is written to HDDs from a single group.

The second method 1010 may alternatively be described in terms of 'stripe stacks'. Having added the j redundancy blocks (in block 1016), blocks with the same offset in each stripe are assembled into stripe stacks (block 1020). For example, if there are m stripes and a first stripe comprises (k+j) blocks denoted $B_{1,1}$, $B_{1,2}$, . . . , $B_{1,(k+j)}$ and the $m^{th}$ stripe comprises (k+j) blocks denoted $B_{m,1}$, $B_{m,2}$, . . . , $B_{m,(k+j)}$, then one stripe stack comprises m blocks $B_{1,1}$, $B_{2,1}$, . . . , $B_{m,1}$ and another stripe stack comprises blocks $B_{1,2}$, $B_{2,2}$, . . . , $B_{m,2}$ etc. As can be seen, each stripe stack comprises m blocks, with the $x^{th}$ stripe stack comprising the $x^{th}$ block from each of the m stripes. Each stripe stack is then written to a different HDD within a group (block 1022).

FIG. 10 also shows a third example method 1030 of writing data to a storage device described herein. While the second example method 1010 may be referred to as 'striping', this third example method 1030 may be referred to as 'segmenting' and this method 1030 does not use the concept of groups (unlike methods 1000 and 1010). In this example method 1030, the extent is divided into n segments (block 1032) and p redundancy segments are added (block 1034). Each segment within the extent is then stored on a different HDD (block 1036), i.e. one segment on each of (n+p) HDDs. In this example the (n+p) HDDs do not necessarily belong to the same group, but instead the size of the segment is selected such that reading it from a HDD would take at least 10 seconds (i.e. at least the time taken to spin up a HDD) and the HDD storing segment i+1 should be spinnable concurrently with the HDD storing segment i. This means that when reading an extent which has been written using method 1030, the HDD storing segment 1 from an extent is initially active and in parallel the HDD storing segment 2 from the same extent is spinning up. When segment 2 is being read, the HDD storing segment 1 is spun down (i.e. the platter is no longer being driven) and the HDD storing segment 3 is spinning up, etc.

Figure 11:
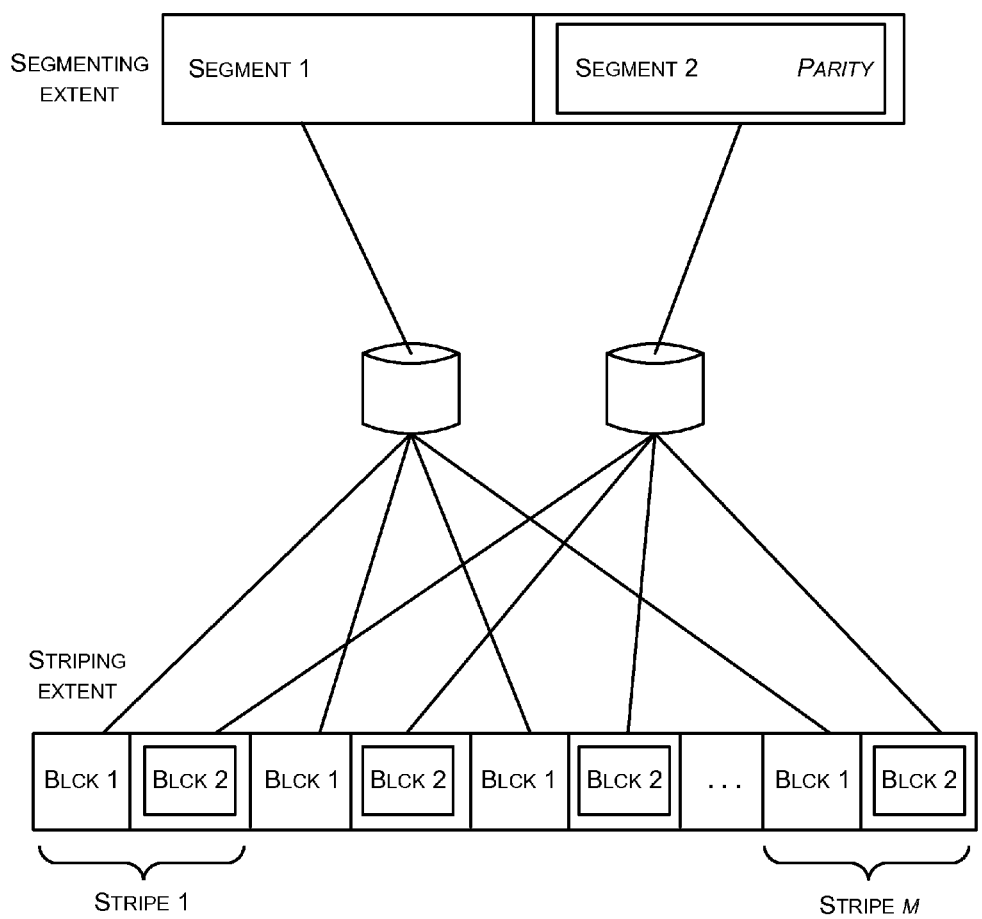
FIG. 11 shows a schematic diagram illustrating differences between two of the methods shown in FIG. 10.

FIG. 11 shows a schematic diagram of striping (as shown in method 1010) compared to segmenting (as shown in method 1030). This diagram shows the situation for k=1, j=1, n=1 and p=1. Segmenting is more flexible for the scheduler (which controls writes to the HDDs) than striping because the constraint is that HDDs storing two consecutive segments must be spinnable together (rather than all the HDDs having to belong to one group). However, the throughput of segmenting is limited to the bandwidth of one HDD, scheduling may be more complex as there are potentially many conflicting parallel operations required to saturate the storage device bandwidth and it requires DRAM proportional to the maximum extent size. Striping, in contrast, provides a high throughput and scheduling is less complex because it is quasi-oblivious to the power and cooling constraints (as these are taken care of by the group definitions); however, there is less flexibility for the scheduler as all the HDDs storing the extent must be from one group (and hence spinnable together).

When writing data to groups of HDDs in the first two example methods 1000, 1010 (e.g. as in blocks 1006 and 1018) the data (i.e. the extents) may be fairly spread across all groups ("even fill") or one group may be filled with data before filling the next one ("sequential fill"). In one example implementation, even fill of groups is used. Even fill results in equal loading of HDDs (which makes maintenance easier) and there is less data to rebuild in the case of HDD failure (as a HDD is unlikely to be completely filled with data); however there may be a lower throughput (than for sequential fill) when the storage device is lightly loaded (i.e. each group is storing a small amount of data) because there are fewer IO per active HDD. In contrast, sequential fill provides more IOs per HDD in a lightly loaded storage device (as the data will be concentrated in a small number of groups), but some HDDs may be inactive for very long periods and this may impact HDD reliability.

Figure 12:
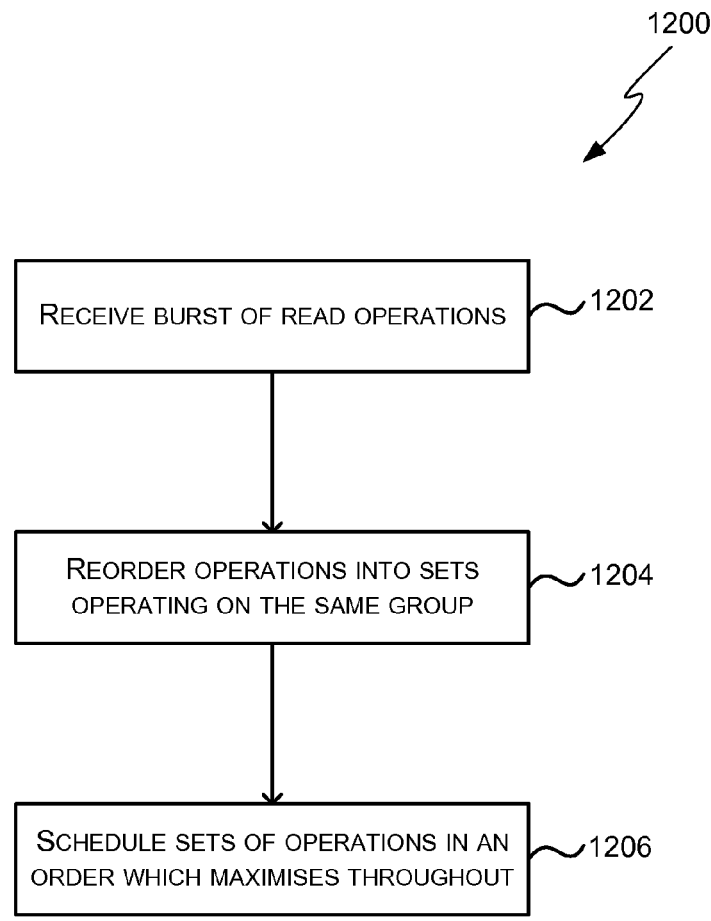
FIG. 12 shows a flow diagram of an example method of scheduling read operations within a storage device.

As well as controlling writes to the HDDs, a scheduler within the server controls read operations on the HDDs. FIG. 12 shows a flow diagram of an example method 1200 of scheduling read operations within a storage device. This method uses the concept of groups and therefore may be used in combination with one of methods 1000 and 1010 for writing data. On receipt of a burst of read operations (block 1202), the scheduler orders operations into sets which operate on the same group of HDDs (block 1204) and then schedules sets of operations in an order which maximizes throughput (block 1206), e.g. by minimizing switching between groups. In some examples, operations may be flagged with a priority level, in which case the sets of operations may be scheduled on the basis of both throughput and priority (in block 1206).

In order to maximize throughput, sets of operations may be ordered (in block 1206) to allow groups to be spun up, while attempting to maintain the interconnect fabric's throughput. For example, if it takes 10 seconds to spin up a HDD, each set of operations may be arranged to provide at least 10 seconds of IO operations in order that another group may be spun up whilst a set of operations is being performed. For example, between $t=t_1$ and $t=t_1+10$, operations are performed on group A and HDDs in group B are spinning up, then between $t=t_1+10$ and $t=t_1+20$, operations are performed on group B and HDDs in group C are spinning up, etc. Sets of operations which operate on disjoint groups can be scheduled in parallel, as long as there is sufficient bandwidth in the interconnect fabric (i.e. as long as a bandwidth constraint is not violated). For example, between $t=t_1$ and $t=t_1+10$, operations are performed on groups A and D and HDDs in groups B and E are spinning up, then between $t=t_1+10$ and $t=t_1+20$, operations are performed on groups B and E and HDDs in groups C and F are spinning up, etc, where groups A and D, B and E and C and F are disjoint. As the bandwidth constraint is not a hard constraint, in some examples, underprovisioned bandwidth may be shared between groups such that each group experiences a bandwidth restriction. For example if there are two operations which each use 18 GB/s of bandwidth and the total available bandwidth is only 32 Gb/s, the two operations may be served concurrently at 16 Gb/s, rather than serving just a single operation at the full bandwidth of 18 Gb/s.

Referring back to FIGS. 8 and 9, if the groups of HDDs are arranged in lines, the scheduler may be aware of these lines and which lines can execute concurrent IOs (as described above). Consequently, the scheduler (in block 1206), may group sets of operations based on this line knowledge and the following criterion may also be used: IOs from two groups of the same line are be separated by at least 10 seconds worth of IO from groups belonging to other lines. This enables the second group from the same line to be spun up during the separation period. It will be appreciated that although the spin up time is assumed to be 10 seconds, the same principle may be applied if the spin up time is a longer or shorter period of time. In scheduling groups (in block 1206), the scheduler may, for example, use an inexpensive greedy algorithm to determine which group to schedule next in order to minimize idle time.

The scheduling of operations (in block 1206) may apply within a burst of read operations (as received in block 1202) or alternatively a window (which may be defined in terms of time or number of operations) may be used to define how may operations in a queue of read operations may be considered for rescheduling at the same time (e.g. a window of 100 or 1000 operations). Where such a window is used, the method of FIG. 12 may be applied even where read operations are not received in bursts (i.e. block 1202 omitted) and in such examples, the reordering and rescheduling (in blocks 1204 and 1206) may be applied on a window of received read operations which are held in a queue.

Where a queue of read operations is reordered (in block 1206) any delay (e.g. over a threshold delay) may be fed back to the requester (i.e. the entity sending the read request).

Although the description of FIG. 12 above relates to read operations, in some examples, the same method may be applied to delete operations.

Figure 13:
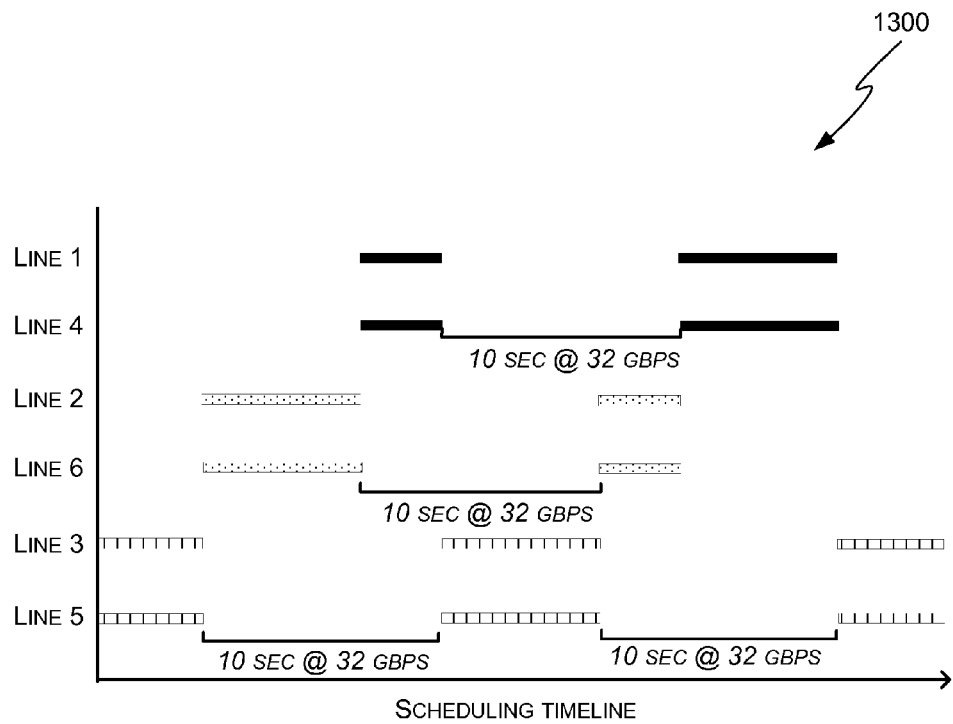
FIG. 13 shows an example scheduling timeline for a storage device.

FIG. 13 shows an example scheduling timeline 1300 for a storage device comprising groups of 16 HDDs and the PCIe interconnect fabric shown in FIG. 3. With groups of 16 HDDs, 2 groups are able to fully use the PCIe bandwidth, therefore at any given moment, 2 groups are doing IO. In the scheduling timeline 1300, at each step the scheduler selects groups to spin up that have enough IO to overlap the transition between two joint (i.e. colliding) groups, which as described may take about 10 seconds.

Many of the methods described above rely on the HDDs within the storage device being logically arranged into fixed groups, where HDDs in a group can be active at the same time. In some examples, however, there may be no fixed groups and instead the set of HDDs which are active at any time may be determined by the scheduler within the server (or another element within the server) based on power constraints, cooling constraints and in some examples some other constraints (e.g. a vibration constraint). Such examples use the concept of domains (as described above with reference to FIG. 2), where a domain is a set of HDDs, and a set of constraints that hold on the domain. For example, a cooling domain has a constraint expressed in Watts, as does a power domain. A single HDD is a member of multiple domains.

Each of the per-domain constraints is mapped to a set of HDD-orientated constraints, i.e. a set of HDD states that can be tolerated by the domain. In the examples above, each HDD is described as being in one of two, or in some examples three, states: not active (i.e. platters not spinning, but electronics powered), spinning up (i.e. platters in process of transitioning from not spinning to spinning at correct speed) and active (i.e. platters spinning). As described above, in some examples, there may be more states considered, such as differentiating, for a HDD with the platters spinning between when data is and is not being read/written. For the power domain, the power draw of each state being considered within the system is known and similarly, for the cooling domain, the cooling load of each state is known. For example, a HDD draws 0.7 W when in standby (or non active state, i.e. electronics powered, platters not spinning), 8 W when active (platters spinning) and 24 W for 10 seconds when the platters are spinning up. A budget can therefore be expressed for each domain as the set of possible states that can be supported by the domain. Referring back to a previous example architecture, the power budget for a domain may be two active HDDs per power domain or one active HDD and one HDD spinning up and the cooling budget may be one active or spinning up HDD per cooling domain. The budget may, for example, be expressed as a state table or finite state machine.

Figure 14:
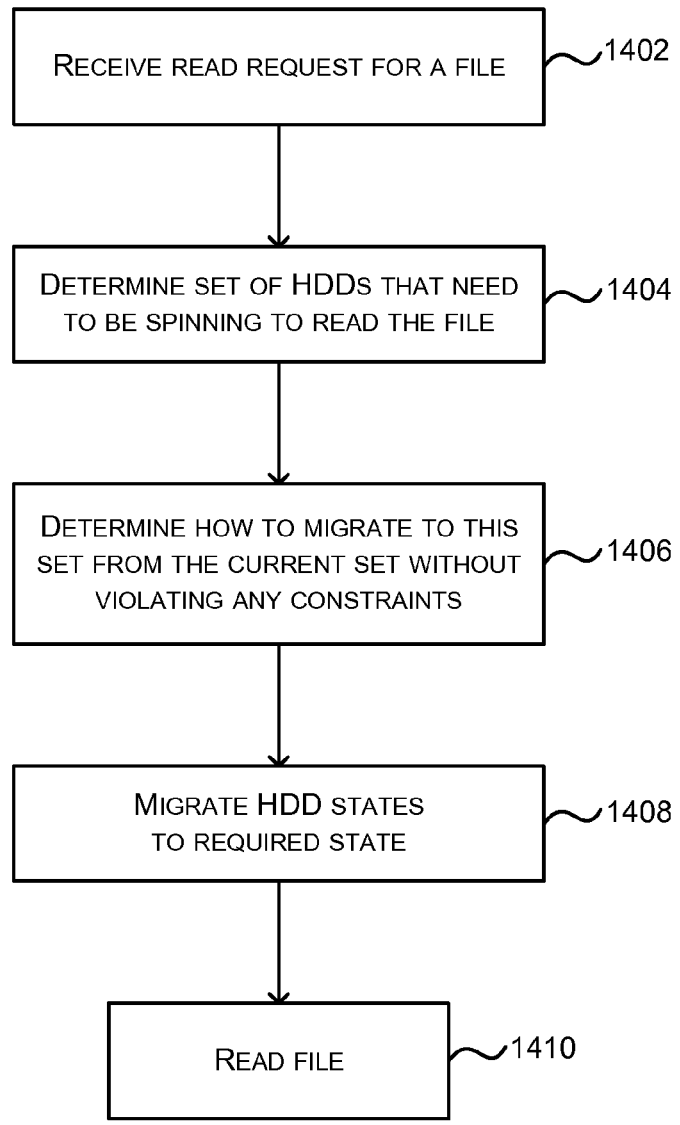
FIG. 14 is a flow diagram of another example method of reading data from the storage device.

FIG. 14 is a flow diagram of an example method of reading data from the storage device where domains are used (as described above). In this example, when a read request for a file is received (block 1402), the scheduler within the server determines the set of HDDs that need to be spinning in order to read the file (block 1404). This set is likely to be different from the currently spinning HDDs and so the scheduler then determines a migration sequence from the current set of spinning HDDs to the required set of spinning HDDs (which may be referred to as the 'target configuration'), where the migration sequence does not pass through any intermediate set of HDDs which violates any of the domain constraints (block 1406). This is therefore an optimization problem to be solved which selects the set of hardware configuration states that need to be passed through in order to get to a configuration where the file can be read. Once the migration sequence is determined, it can be implemented (block 1408) and the file read (block 1410).

In implementing the method of FIG. 14, a burst of read operations may be considered (e.g. as described above with reference to FIG. 12) and in which case the migration sequence may be determined to optimize the throughput for the burst rather than a single request. In such an example, the time taken to spin up platters (e.g. 10 seconds) may be taken into consideration in the same way as described previously and IO requests may be grouped into operations on common sets of HDDs which last at least 10 seconds.

The scheduling shown in FIGS. 12 and 13 and described above an operation (e.g. accessing a set of stripe stacks) is associated with a set of HDDs which need to be accessed. Where two operations do not conflict (i.e. there is no overlap between sets of HDDs) they can execute in parallel. If, however, all the HDDs are in conflict, operations are processed sequentially. If, however, only a fraction of the HDDs conflict, two different scheduling mechanisms may be used and in the methods described above, a mechanism which may be referred to as 'non-preemptive scheduling' may be used.

With 'non-preemptive scheduling', 100% of one of the two conflicting operations is processed and the second one is stalled (even if the two operations have as few as one HDD in conflict). The second operation is processed (in its entirety) when the conflict has been resolved (e.g. when the first operation has been completed). In contrast for 'preemptive scheduling', 100% of one of the two conflicting operations is processed and the non-conflicting n % of the other operation is processed in parallel, with the remaining (100−n) % being finished later.

In preemptive scheduling, which may be used with the method shown in FIG. 14 the scheduling is performed at HDD granularity: the scheduler decides which HDD to spin up next regardless of which operations are currently processed. The scheduler is domain-aware and schedules HDDs that are not in conflict. For non-preemptive scheduling, however, the scheduler either spins up all the HDDs required for an operation or delays the operation if this is not possible. The scheduler is domain-oblivious and focuses on operation-conflict avoidance.

Preemptive scheduling potentially has increased scheduling flexibility but this results in increased scheduling complexity. Preemptive scheduling also potentially has higher throughput but higher latency per operation as several spin up times may be required per operation. Preemptive scheduling also uses large in-memory buffers at the server to store pending operations, which increase the cost of the storage device and decreases its reliability. Non-preemptive scheduling, in contrast, provides guarantees in terms of throughput per operation and has low memory requirements.

In addition to considering power and cooling domains in any of the methods described above (e.g. in any of the methods shown in FIGS. 10, 12 and 14), other constraints (e.g. soft constraints) and other domains may also be taken into consideration. Soft constraints are those which if violated yield sub-optimal performance but will not result in hardware failure (as is the case for hard constraints such as the power and cooling constraints). The soft constraints may be expressed based on domains, for example failure and physical locality. The failure domain captures sets of HDDs and the likelihood that they will concurrently fail. The physical locality captures the locality properties of the interconnect fabric and may be expressed in terms of functions that given two HDDs returns a value V between 0 and 1. The value, V, represents the interference between the two HDDs (1=no interference, while a value less than 1 represents the strength of the relationship). Given a nominal bandwidth A per HDD, the expected maximum throughput of both HDDs are reading/writing concurrently is V×A.

Figure 15:
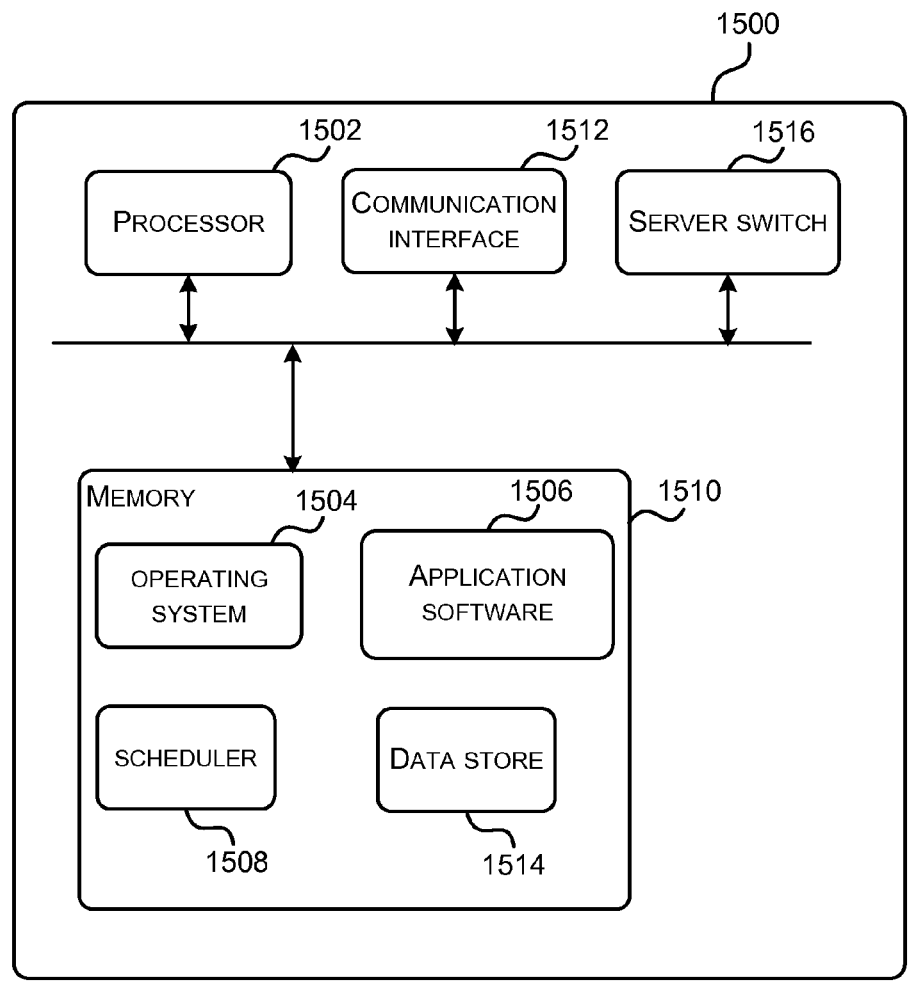
FIG. 15 illustrates an exemplary computing-based device in which embodiments of the methods of controlling HDDs described herein may be implemented.

FIG. 15 illustrates various components of an exemplary computing-based device 1500 which may be implemented as any form of a computing and/or electronic device, and which may operate as a server within the storage device described herein.

Computing-based device 1500 comprises one or more processors 1502 which may be microprocessors, controllers or any other suitable type of processors for processing computer executable instructions to control the operation of the device in order to operate as a server and control read/write operations to the HDDs in the storage device. In some examples, for example where a system on a chip architecture is used, the processors 1502 may include one or more fixed function blocks (also referred to as accelerators) which implement a part of the method of controlling the HDDs in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 1504 or any other suitable platform software may be provided at the computing-based device to enable application software 1506 and scheduler 1508 to be executed on the device. The computer executable instructions may be provided using any computer-readable media that is accessible by computing based device 1500. Computer-readable media may include, for example, computer storage media such as memory 1510 and communications media. Computer storage media, such as memory 1510, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1510) is shown within the computing-based device 1500 it will be appreciated that the storage may be distributed or located remotely and accessed via a network or other communication link (e.g. using communication interface 1512).

In some examples the computing-based device 1500 may be managed remotely and in which case, the communication interface 1512 may be arranged to receive management instructions from a remote management entity and to provide status/update information to the remote management entity.

The memory 1510 may further comprise a data store 1514 which may be used to store access flags for each HDD in the storage device (e.g. as described above with reference to FIG. 5).

The computing-based device 1500 also comprises a server switch 1516 arranged to output signals to each of the backplane switches via an interconnect fabric (e.g. as described above with reference to FIG. 3 or 4). These signals control the state of the HDDs and also are used when writing to or reading from an HDD. Alternatively, where the SATA based interconnect fabric 400 is used, the server switch 1516 is replaced by an HDD controller, which provides a plurality of SATA ports each connecting to a SATA multiplexer 404 at the top level of the tree.

The computing-based device 1500 may also comprise an input/output controller arranged to output display information to a display device which may be separate from or integral to the computing-based device. The display information may provide a graphical user interface. The input/output controller may also be arranged to receive and process input from one or more devices, such as a user input device (e.g. a mouse, keyboard, camera, microphone or other sensor). In some examples the user input device may detect voice input, user gestures or other user actions and may provide a natural user interface (NUI). In an embodiment the display device may also act as the user input device if it is a touch sensitive display device. The input/output controller may also output data to devices other than the display device.

Any of the input/output controller, display device and the user input device (where provided) may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In the above examples, the constraints are set by the design of the storage device and hence may be considered fixed. Where groups are used, these are determined by the constraints and may therefore also be considered fixed. In the event of hardware failure, however, the server may be arranged to modify the constraints (and hence groups, where they are used) in order that the storage device can continue to function, even if performance may be degraded. For example, a storage device may comprise 6 power supply units, each powering a number of trays (e.g. powering 12 trays) and where a power supply unit fails, another power supply unit within the storage device may be shared between a larger number of trays (e.g. between 24 trays) and the constraints and/or groups may be dynamically adapted to respond to this. The constraints/groups may also be modified (e.g. dynamically adapted) in event of replacing any of the hardware (e.g. the HDDs) with more efficient hardware (e.g. the power and/or cooling constraints associated with a more efficient HDD may be different, enabling larger or different size groups).

In the event of hardware failure, there may be one or more recovery mechanisms operational within the storage device in addition to, or instead of, adapting the constraints and/or groups. Examples include: maintaining spare capacity within a group to handle HDD failure (e.g. each group comprises one or two more HDDs than are used for each operation), maintaining a spare group of HDDs for redundancy purposes (e.g. which can be switched in to replace a group experiencing HDD failure), and spreading load across other groups.

Although the present examples are described and illustrated herein as being implemented in a storage device comprising one or two servers, the system described is provided as an example and not a limitation. As those skilled in the art will appreciate, the present examples are suitable for application in a variety of different types of storage systems, for example, multiple storage devices may be co-located (e.g. in a data center) and there may be some sharing of resources (e.g. power supply units) in the event of failure. Furthermore, although two example interconnect fabrics 300, 400 are described above, alternative designs of interconnect fabric maybe used.

As described above, in some examples the server 104 may be located remotely from the rest of the storage device 100. In such examples, control logic 112 may be provided within the storage device 100 and arranged to provide control signals to the HDDs 102 via the interconnect fabric 106 in response to signals received from the remote server.

The storage device described above is intended for minimal read/write access to the HDDs and therefore is configured to keep the majority of HDDs in a sleeping (i.e. not active) state where they consume minimal power (the electronics are powered but the platters are not spinning) The HDDs are only brought out of this state to initially write the data, check the data for integrity or to retrieve the data;

however, since the data type for which the storage device is designed is archival, retrieval operations are expected to be minimal Consequently, the storage device may be designed to use minimal power and associated cooling. For the example configuration comprising 1152 HDDs (as described above), the storage device may be designed to use 2.4 kW or less than 25% of existing storage devices (with similar storage capacity). This requires less power distribution (within the storage device), smaller fans and enables a greater packing density of HDDs due a lower volume of cooling (e.g. forced air) going through the storage device. As described above, the storage devices described herein are underprovisioned such that they are not capable of providing sufficient power and/or cooling for all of the HDDs in the device (i.e. they physically cannot spin up all the HDDs concurrently). In an example, the storage device may provide sufficient power and cooling for only around 10% or less (e.g. 8.3%) of the HDDs to be active at any one time. This underprovisioning reduces the power consumption and hence operating expense of the device and the reduced bandwidth of the device may also contribute to a further reduction in the operating costs. The higher packing density of HDDs which is enabled and the reduction in the power and cooling infrastructure contributes to lower initial costs of the storage device to buy (e.g. lower capital expenditure).

The storage device described above provides an example of s device where the physical hardware and software are designed together such that the software (or control logic) prevents the storage device from entering states in which a set of HDDs are active which will cause failure of the overall device due to insufficient power and/or cooling.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset, i.e. such that a subset is not equal to the set and necessarily excludes at least one member of the set.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An electronic storage system comprising:
   a plurality of storage devices, each storage device having an active state and a non active state;
   the plurality of storage devices being arranged logically into groups, each group comprising a plurality of storage devices capable of being in an active state concurrently;
   each storage device belonging to a cooling domain and a power domain, a cooling domain comprising storage devices linked by a cooling constraint and a power domain comprising storage devices linked by a power constraint;

a power supply system capable of providing sufficient power for only a subset of the plurality of storage devices to be in an active state concurrently;

a cooling system provisioned to provide sufficient cooling when operating for only a subset of the plurality of storage devices to be in an active state concurrently; and a control mechanism arranged to dynamically control which of the plurality of storage devices are in an active state.

2. The electronic storage system according to claim 1, wherein each of the plurality of storage devices has a maximum bandwidth in the active state.

3. The electronic storage system according to claim 1, wherein the control mechanism comprises at least one of software running on a server and control logic.

4. The electronic storage system according to claim 1, further comprising an interconnect fabric connecting the plurality of storage devices and a server, the interconnect fabric comprising a plurality of SATA controllers and PCIe switches, wherein each of the plurality of storage devices is connected to the server via a SATA controller and one or more PCIe switches arranged in a tree structure and wherein the PCIe switches are physically distributed within the electronic storage system.

5. The electronic storage system according to claim 1, further comprising an interconnect fabric connecting the plurality of devices and a server, the interconnect fabric comprising a plurality of SATA multiplexers arranged in a tree structure.

6. The electronic storage system according to claim 1, further comprising a server comprising a data store arranged to store a 'no access' flag associated with each of the plurality of storage devices and when set, a 'no access' flag causes all IO requests on a storage device to fail.

7. The electronic storage system according to claim 1, wherein the cooling constraint corresponds to characteristics of the cooling system and the power constraint corresponds to characteristics of the power supply system and wherein each group comprises a plurality of storage devices in non-overlapping cooling domains and non-overlapping power domains.

8. The electronic storage system according to claim 7, wherein the plurality of storage devices are arranged logically into groups such that each group comprises a plurality of storage devices in non-overlapping cooling domains and non-overlapping power domains and wherein groups are arranged to be either fully colliding or disjoint, wherein two groups are fully colliding if each storage device in a first group is a member of the same cooling and power domain as storage devices in a second group and two groups are disjoint if each storage device in a first group is not a member of the same cooling or power domain as any storage device in a second group.

9. The electronic storage system according to claim 1, further comprising a server comprising a scheduler arranged to:
receive a burst of data to be written to the electronic storage system divided into portions;
add error correction data to each portion; and
write each portion to storage devices from a single group.

10. The electronic storage system according to claim 1, wherein each portion is divided into a plurality of stripes and each stripe is divided into a plurality of blocks, and wherein adding error correction to each portion comprises: adding one or more blocks comprising redundancy information to each stripe and wherein writing each portion to storage devices from a single group comprises:
for each stripe, writing one block from the stripe to a different one of the storage devices from the single group.

11. The electronic storage system according to claim 10, wherein for each stripe, writing one block from the stripe to a different one of the storage devices from the single group comprises:
assembling a sequence of blocks comprising one block from each stripe; and
writing each sequence of blocks to a separate storage device from the single group.

12. The electronic storage system according to claim 1, further comprising a server comprising a scheduler arranged to:
reorder a plurality of operations into sets of operations operating on the same group of storage devices, the operations comprising one or more of read, write and delete operations; and
schedule sets of operations in an order which maximizes throughput of the electronic storage system.

13. The electronic storage system according to claim 12, wherein the scheduler is further arranged to receive a burst of operations and to perform reordering on the burst of operations.

14. The electronic storage system according to claim 12, wherein the scheduler is arranged to perform reordering on a subset of operations in a queue of operations, wherein the subset of operations is defined by a window and wherein the window has a length specified in terms of a number of operations or a period of time.

15. The electronic storage system according to claim 12, wherein the scheduler is arranged to schedule sets of operations in an order which minimizes switching between groups of storage devices.

16. The electronic storage system according to claim 1, further comprising a server comprising a scheduler arranged to:
receive a burst of data to be written to the electronic storage system divided into portions;
divide each portion into a plurality of segments;
add one or more error correction segments; and
write each segment to a different storage device from a single group.

17. The electronic storage system according to claim 1, wherein each storage device belongs to a cooling domain and a power domain, a cooling domain comprising storage devices linked by a cooling constraint and a power domain comprising storage devices linked by a power constraint, the cooling constraint corresponding to characteristics of the cooling system and the power constraint corresponding to characteristics of the power supply system,
the electronic storage system further comprising a server comprising a scheduler arranged to:
identify a subset of the storage devices storing data corresponding to a read request;
determine a migration path from a current configuration comprising those storage devices in an active state to a target configuration comprising the identified subset of storage devices in active state via a plurality of intermediate configurations, wherein each configuration satisfies all power and cooling constraints; and migrating the current configuration of the electronic storage system to the target configuration via the plurality of intermediate configurations.

18. A method of operating an electronic storage system comprising a plurality of storage devices and insufficient cooling and power infrastructure for all of the storage devices to be in an active state concurrently, wherein the plurality of storage devices are arranged logically into groups, each group comprising a plurality of storage devices capable of being in the active state concurrently, the method comprising:
  reordering a plurality of operations into sets of operations operating on the same group of storage devices; and
  scheduling sets of operations in an order which maximizes throughput of the electronic storage system.

19. An electronic storage system comprising:
  a plurality of storage devices, each storage device having an active state and a non active state, and the plurality of storage devices being arranged logically into groups, each group comprising a plurality of storage devices capable of being in an active state concurrently;
  the plurality of storage devices being arranged logically into groups, each group comprising a plurality of storage devices capable of being in an active state concurrently;
  each storage device belonging to a cooling domain and a power domain, a cooling domain comprising storage devices linked by a cooling constraint and a power domain comprising storage devices linked by a power constraint;
  a power supply system capable of providing sufficient power for only a subset of the storage devices to be in an active state concurrently;
  a cooling system provisioned to provide sufficient cooling when operating for only a subset of the storage devices to be in an active state concurrently; and
  a control mechanism arranged to dynamically control which groups of storage devices are in an active state according to any IO requests received by the server.

20. The electronic storage system according to claim 1 wherein the subset comprises no more than 10% of the plurality of storage devices.

\* \* \* \* \*